United States Patent [19]
Showalter

[11] Patent Number: 5,992,592
[45] Date of Patent: Nov. 30, 1999

[54] BI-DIRECTIONAL OVERRUNNING CLUTCH ASSEMBLY FOR TRANSFER CASES AND THE LIKE

[75] Inventor: Dan J. Showalter, Plymouth, Mich.

[73] Assignee: Borg-Warner Automotive, Inc., Troy, Mich.

[21] Appl. No.: 09/046,524

[22] Filed: Mar. 24, 1998

[51] Int. Cl.[6] .................................................. F16D 11/06
[52] U.S. Cl. .......................... 192/43.1; 192/46; 192/47; 192/93 B
[58] Field of Search .............................. 192/43, 43.1, 46, 192/47, 71, 93 B; 180/233, 247, 248

[56] References Cited

U.S. PATENT DOCUMENTS

| | | | |
|---|---|---|---|
| 3,993,152 | 11/1976 | Fogelberg | 180/249 |
| 4,044,870 | 8/1977 | Fogelberg | 192/38 |
| 4,047,601 | 9/1977 | Fogelberg et al. | 192/36 |
| 4,076,108 | 2/1978 | Fogelberg | 192/35 |
| 4,083,419 | 4/1978 | Fogelberg | 180/233 |
| 4,098,379 | 7/1978 | Fogelberg et al. | 192/38 |
| 4,119,168 | 10/1978 | Fogelberg | 180/248 |
| 4,124,085 | 11/1978 | Fogelberg | 180/249 |
| 4,132,297 | 1/1979 | Brown et al. | 192/36 |
| 4,184,575 | 1/1980 | Fogelberg | 192/36 |
| 4,185,723 | 1/1980 | Kelbel | 192/36 |
| 4,222,473 | 9/1980 | Kopich | 192/43.1 |
| 4,361,216 | 11/1982 | Overbeek | 192/36 |
| 4,440,042 | 4/1984 | Holdeman | 475/269 |
| 4,620,621 | 11/1986 | Kulczycki et al. | 192/3.31 |
| 5,007,498 | 4/1991 | Wiese et al. | 280/248 |
| 5,170,870 | 12/1992 | Kämpf | 192/43.1 X |
| 5,195,604 | 3/1993 | Brockett et al. | 180/248 |
| 5,584,776 | 12/1996 | Weilant et al. | 192/233 X |
| 5,782,328 | 7/1998 | Fogelberg et al. | 192/47 X |

FOREIGN PATENT DOCUMENTS

| | | | |
|---|---|---|---|
| 4001137 C1 | 7/1991 | Germany | 192/43.1 |
| 1171064 | 11/1969 | United Kingdom . | |
| 2250551 | 6/1992 | United Kingdom . | |
| 2278896 | 12/1994 | United Kingdom . | |
| 2278898 | 12/1994 | United Kingdom . | |
| 2278899 | 12/1994 | United Kingdom . | |

*Primary Examiner*—Richard M. Lorence
*Attorney, Agent, or Firm*—Brinks, Hofer, Gilson & Lione; Greg Dziegielewski

[57] ABSTRACT

An active multi-mode overrunning clutch assembly includes concentric inner and outer members and a plurality of opposed pairs of clutch pawls operably disposed between the members. The clutch pawls are biased radially outwardly and include recessed portions and raised lands which cooperate with an axially translatable circumferential control sleeve. The control sleeve can be translated to select various combinations of active (engaged) or inactive (retracted) pawls to effect four distinct operational modes: fully engaged, i.e., locked in both directions, drive and overrunning in a first direction, drive and overrunning in the reverse direction and fully disengaged, i.e., released or inactive. The active multi-mode overrunning clutch assembly finds particular application in transfer cases of four wheel drive vehicles.

24 Claims, 6 Drawing Sheets

BI-DIRECTIONAL OVERRUNNING CLUTCH ASSEMBLY FOR TRANSFER CASES AND THE LIKE

BACKGROUND OF THE INVENTION

The invention relates generally to double or bi-directional overrunning clutch assemblies and more particularly to an actively controlled, bi-directional overrunning clutch assembly for use in motor vehicle driveline components such as transfer cases, transmissions, differentials and the like.

The sophistication of consumer vehicle four-wheel drive systems continues to increase. Initially, four-wheel drive systems were confined to trucks and vehicles primarily intended for off-road use. Such systems were both complex from a mechanical standpoint and complicated from an operational standpoint. Invariably, it was necessary to stop the vehicle to place the drive train into four-wheel drive and furthermore necessary to dismount the vehicle and manually activate drive hubs to couple the secondary drive wheels to the secondary axles.

Slowly the application of such systems expanded to light duty trucks, sport utility vehicles, vans and even some passenger cars as the systems became simplified, more sophisticated and easier to use. Such systems could often be activated on the fly and axle disconnects incorporated, for example, in the front differential obviated the need to dismount the vehicle to lock or unlock the manual wheel mounted locking hubs.

The current generation of four-wheel drive vehicles often includes adaptive drive systems wherein axle or wheel speed sensors provide data to a controller which selectively delivers torque or, contrariwise, applies braking, to control wheel slip, that is, front to rear speed differentials, in order to improve the driveability of such vehicles. The drivelines of such adaptive vehicle drive systems generally include a transfer case driven by the vehicle transmission which, through a modulating electromagnetic or hydraulically operated clutch, redistributes torque from the primary driveline and wheels to the secondary driveline and wheels. Typically, under conditions of no slip the primary driveline, which is coupled to and drives either the front or rear wheels of the vehicle, will carry and deliver substantially the full torque output of the transmission. When a speed differential is sensed, indicating wheel slip is present, the clutch increasingly couples the two drivelines, thereby transferring torque to the secondary driveline and wheels. When the modulating clutch is fully engaged, a fifty-fifty torque split exists between the primary and secondary drivelines.

Less complex four-wheel drive systems are also available. Typically such systems are full time rather than adaptive and include passive mechanical components such as viscous clutches or differentials having epicyclic gear trains which control torque delivery to the front and rear wheels of the vehicle. One early passive torque control configuration utilized a one-way or overrunning clutch to provide drive torque to the front wheels if the rear wheels should overspeed them, indicating that they were slipping. Such a passive, mechanical system was inexpensive but had the disadvantage of not operating in reverse gear. This disadvantage was overcome by the incorporation of double or bi-directional overrunning clutches which transfer torque to the secondary driveline in both forward and reverse gears while providing the desired torque transfer to the secondary drive wheels upon primary drive wheel overrun. However, passive mechanical double overrunning clutches do not always provide stable and predictable vehicle handling characteristics. Accordingly, improvement in the structure, operation and control of double overrunning clutch assemblies in motor vehicle drivelines is desirable.

SUMMARY OF THE INVENTION

An active multi-mode overrunning clutch assembly includes concentric inner and outer members and a plurality of opposed pairs of clutch pawls operably disposed between the members. The clutch pawls are biased radially outwardly and include recessed portions and raised lands which cooperate with an axially translatable circumferential control sleeve. The control sleeve can be translated to select various combinations of active (engaged) or inactive (retracted) pawls to effect four distinct operational modes: fully engaged, i.e., locked in both directions, drive and overrunning in a first direction, drive and overrunning in the reverse direction and fully disengaged, i.e., released or inactive. The active multi-mode overrunning clutch assembly finds particular application in transfer cases of four wheel drive vehicles.

The invention also includes a plurality of speed and position sensors such as drive shaft speed sensors and a throttle position sensor which provide signals to a microcontroller. The microcontroller selects the appropriate operational mode based upon sensor signals, stored data and driver selection.

Thus it is an object of the present invention to provide a double overrunning clutch assembly for use in motor vehicle transfer cases.

It is a further object of the present invention to provide an actively controllable double overrunning clutch assembly for use in motor vehicle transfer cases.

It is a further object of the present invention to provide a double overrunning clutch assembly having at least two distinct overrunning operational modes.

It is a still further object of the present invention to provide a double overrunning clutch assembly having four distinct modes of operation.

It is a still further object of the present invention to provide an actively controlled multi-mode overrunning clutch assembly having a controller which receives signals from various speed sensors and, for example, a throttle position sensor, and controls the operating mode of the clutch assembly.

Further objects and advantages of the present invention will become apparent by reference to the following description of the preferred embodiment and appended drawings wherein like reference numbers refer to the same assembly, component, element or feature.

DESCRIPTION OF THE PREFERRED AND ALTERNATE EMBODIMENTS

Figure 1:
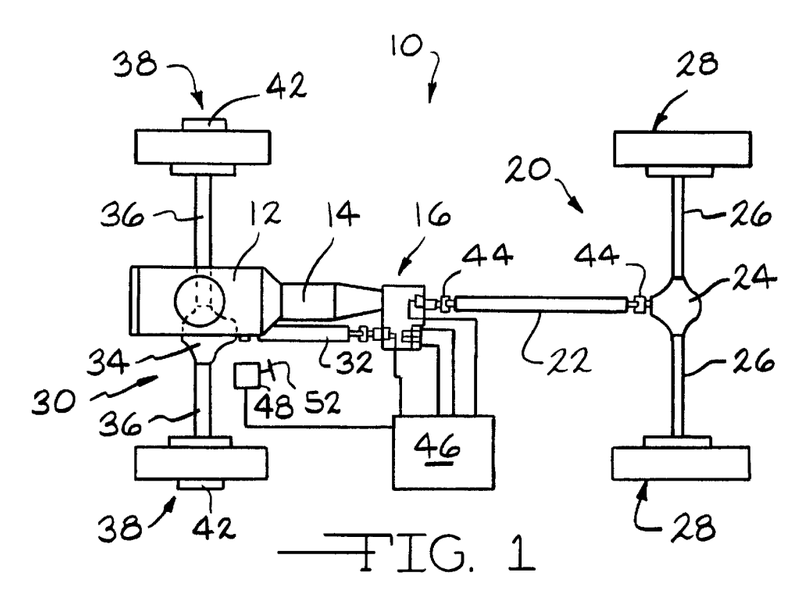
FIG. 1 is a diagrammatic, plan view of a motor vehicle driveline and transfer case incorporating the present invention.

Referring now to FIG. 1, a vehicle drive system incorporating the present invention is illustrated and generally designated by the reference numeral 10. The vehicle drive system 10 includes a prime mover, such an internal combustion engine 12, which drives a conventional transmission 14 which may either be a manual transmission with a clutch or an automatic transmission. The output of the transmission 14 drives a transfer case assembly 16. In turn, the transfer case assembly 16 is operably coupled to and drives a rear or primary driveline 20 having a rear or primary drive shaft 22 which is operably coupled to and drives a rear or primary differential 24. The primary or rear differential 24 drives a pair of aligned primary or rear axles 26 which are coupled to a respective pair of primary or rear tire and wheel assemblies 28.

The transfer case assembly 16 also provides torque to a front or secondary driveline 30. The secondary driveline 30 includes a front or secondary drive shaft 32 which in turn drives the front or secondary differential 34. The secondary differential 34 operates in conventional fashion and provides drive torque through a pair of aligned front or secondary axles 36. A pair of front or secondary tire and wheel assembles 38 are disposed at the front of the vehicle. A pair of locking hubs 42 may be operably disposed between a respective one of the front or secondary pair of axles 36 and the front tire and wheel assemblies 38. The locking hubs 42 may be either remotely operated and thus include electrical or pneumatic operators or may be manually activated. Alternatively, front axle disconnects (not illustrated) may be housed within the front or secondary differential 34 and the axle disconnects may be activated or deactivated to couple or uncouple the secondary axles 36 from the output of the secondary differential 34. Finally, both the primary driveline 20 and the secondary driveline 30 may include suitable and appropriately disposed universal joints 44 which function in conventional fashion to allow static and dynamic offsets and misalignments between the various shafts and components.

The system 10 may also include a microcontroller 46 having various programs and subroutines which receive various data from vehicle sensors and provide control outputs to achieve the design function and goals of the present invention which will be more fully described below. Specifically, the system 10 may include a throttle position sensor 48 which provides a continuously variable or substantially continuously variable (analog) output or multiple step (incremental) output providing appropriate resolution of the position of a throttle pedal 52 to the microcontroller 46.

It should be understood that the designations "primary" and "secondary" appearing both above and below refer to drivelines and driveline components in the system 10 which are primarily and secondarily intended to propel a vehicle. That is, in the system 10 illustrated, the inventor describes a vehicle which is commonly referred to as a rear wheel drive vehicle in which the rear tire and wheel assemblies 28 primarily, from both a time and torque standpoint, propel the vehicle. Hence, the secondary driveline 30 and the front or secondary tire and wheel assemblies 38 typically function intermittently, that is, on an as needed basis, to provide improved vehicle performance and stability in adverse driving conditions. It should be understood, however, that the operating components described herein are fully and equally usable and suitable for a vehicle wherein the primary driveline and tires are disposed at the front of the vehicle, that is, a vehicle commonly referred to as a front wheel drive vehicle, and the secondary driveline and tires are located toward the rear of the vehicle. Hence, the designations "primary" and "secondary" as used herein broadly characterize the function of the individual drivelines rather than their specific locations.

Figure 2:
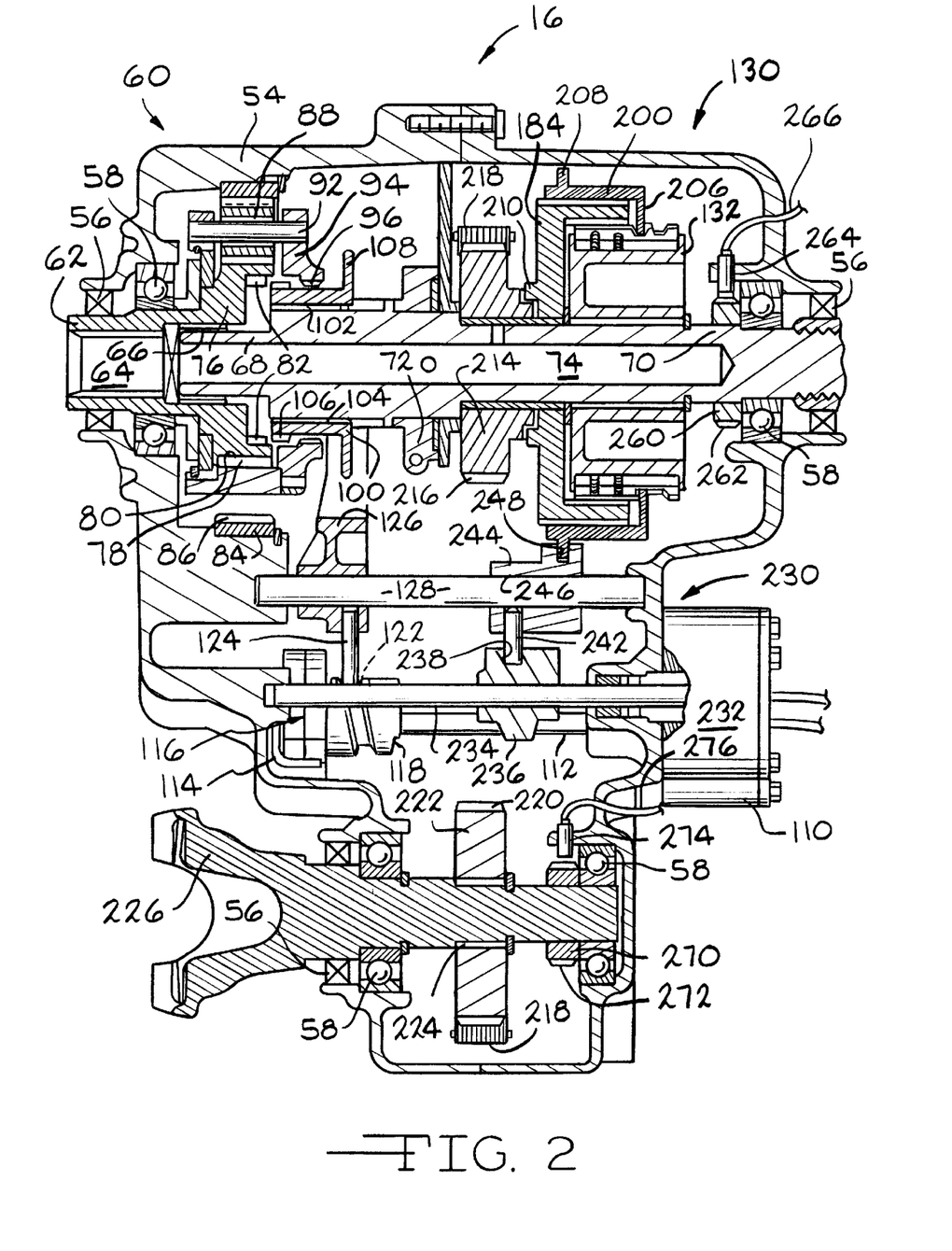
FIG. 2 is a full, sectional view of a motor vehicle transfer case incorporating an active double overrunning clutch assembly according to the present invention.

Referring now to FIG. 2, it will be appreciated that the transfer case assembly 16 includes a multiple part, typically cast, housing 54 having various openings for shafts and fasteners, various grooves and mounting surfaces, oil seals 56, anti-friction bearings such as ball bearing assemblies 58, seal retaining rings and other internal components as will be readily appreciated.

The transfer case assembly 16 also includes a planetary gear assembly 60 which is driven by an input shaft 62 rotatably supported within the housing 54 of the transfer case assembly 16 by one of the ball bearing assemblies 58. The input shaft 62 is coupled to and driven by the output of the transmission 14. The input shaft 62 defines a re-entrant bore 64 which receives a roller bearing assembly 66. The roller bearing assembly 66, in turn, receives and rotatably supports the forward terminus 68 of a primary (rear) output shaft 70. A gerotor pump 72 is secured about and is driven by the output shaft 70. The gerotor pump 72 provides lubricating fluid under pressure to a passageway 74 which extends axially within the output shaft 70 and distributes lubricating and cooling fluid to components of the transfer case assembly 16.

In the planetary gear assembly 60, the input shaft 62 defines an enlarged, bell-shaped region 76 having a plurality of external teeth 78 which define a sun gear 80. On the inner surface of the bell-shaped region 76 of the input shaft 62 are a plurality of female splines or gear teeth 82. Radially aligned with the sun gear teeth 78 and secured to the housing 54 is a stationary ring gear 84 having a plurality of female or internal gear teeth 86. A plurality of planet or pinion gears 88, one of which is illustrated in FIG. 2, are rotatably received upon a like plurality of stub shafts 92 which are fixedly mounted within a planetary gear carrier 94. The carrier 94 includes a plurality of inwardly directed female splines or gear teeth 96 on a surface generally axially adjacent but spaced from the internal splines or gear teeth 82 defined by the input shaft 62. The planetary gear assembly 60 is more fully described in co-owned U.S. Pat. No. 4,440,042 which is herein incorporated by a reference.

An axially sliding, that is, dog type, clutch 100 is received about the output shaft 70. The dog clutch 100 defines an inwardly directed plurality of female splines or gear teeth 102 which are complementary to and mate with a like plurality of external splines or male gear teeth 104 disposed about the periphery of the output shaft 70. The dog clutch 100 thus rotates with the output shaft 70 but may slide axially therealong. The dog clutch 100 includes a region of male splines or external gear teeth 106 which are complementary to the teeth or splines 82 and 96 disposed on the input shaft 62 and the planetary gear carrier 94, respectively. The dog clutch 100 also includes a radially and circumferentially extending flange 108 on its end opposite the gear teeth 106.

The dog clutch 100 is axially translatable between a first, forward position wherein the external teeth 106 couple with the gear teeth 82 and provide direct drive between the input shaft 62 and the output shaft 70 and a second, rearward position, to the right in FIG. 2, wherein the dog clutch 100 engages the gear teeth 96 on the carrier 94 and provides a reduced speed drive between the input shaft 62 and the output shaft 70 in accordance with the gear ratio provided by the planetary gear assembly 60. Typically, such gear and speed reduction ratios are in the range of 2.5:1 to 4.0:1. The dog clutch 100 may also be moved to a third, neutral position mid-way between the forward, direct drive position and the rearward, reduced speed drive position. In this middle position, the input shaft 62 is disconnected from the output shaft 70 and no torque is transferred therebetween.

The position of the dog clutch 100 is commanded by an electric shift control motor 110. The electric shift control motor 110 bi-directionally rotates a drive shaft 112. The drive shaft 112 is suitably supported for rotation within the housing 54 of the transfer case assembly 16. The position of the drive shaft 112 may be monitored and read by an encoder assembly (not illustrated) which provides information about the current position of the drive shaft 112 and the dog clutch 100 to the microcontroller 46.

The drive shaft 112 is coupled to a radially extending arm 114. The arm 114 is connected to one end of a spiral spring assembly 116. The other end of the spring assembly 116 is connected to a cylindrical cam 118. The spring assembly 116 functions as a resilient, energy storing coupling between the drive shaft 112 and the cylindrical cam 118 to absorb differences between the movement commanded by the drive motor 110 and the driven components so that the shift motor 110 is allowed to reach its final requested position. The spring assembly 116 allows rapid and smooth response to a requested repositioning of the dog clutch 100 in situations where the gear teeth 106 of the dog clutch 100 do not instantaneously engage the internal teeth 82 of the input shaft 62 or the internal gear teeth 96 of the carrier 94. When relative rotation of the dog clutch 100 allows engagement of the aforementioned clutch teeth, potential energy stored in the spring assembly 116 rotates the cylindrical cam 118 to its requested position, thus completing the shift.

The cylindrical cam 118 defines a helical track 122 which extends preferably about 270° around the cam 118. The helical track 122 receives a pin or cam follower 124 which is coupled to and translates a fork assembly 126. The fork assembly 126 is supported for bi-directional translation upon a fixed shaft 128 and engages the periphery of the dog clutch 100. Rotation of the shaft 112 axially repositions the cam follower 124 and axially repositions the dog clutch 100 from one to another of the three positions described above.

It will be appreciated that the planetary gear assembly 60 including the mechanism of the dog clutch 100 which provides dual range, i.e., high and low speed, capability to the transfer case assembly 16 is optional and that the vehicle drive system 10 and the transfer case assembly 16 are fully functional as a single speed, direct drive unit and may be utilized without this component and the dual speed range capability provided thereby.

Figure 3:
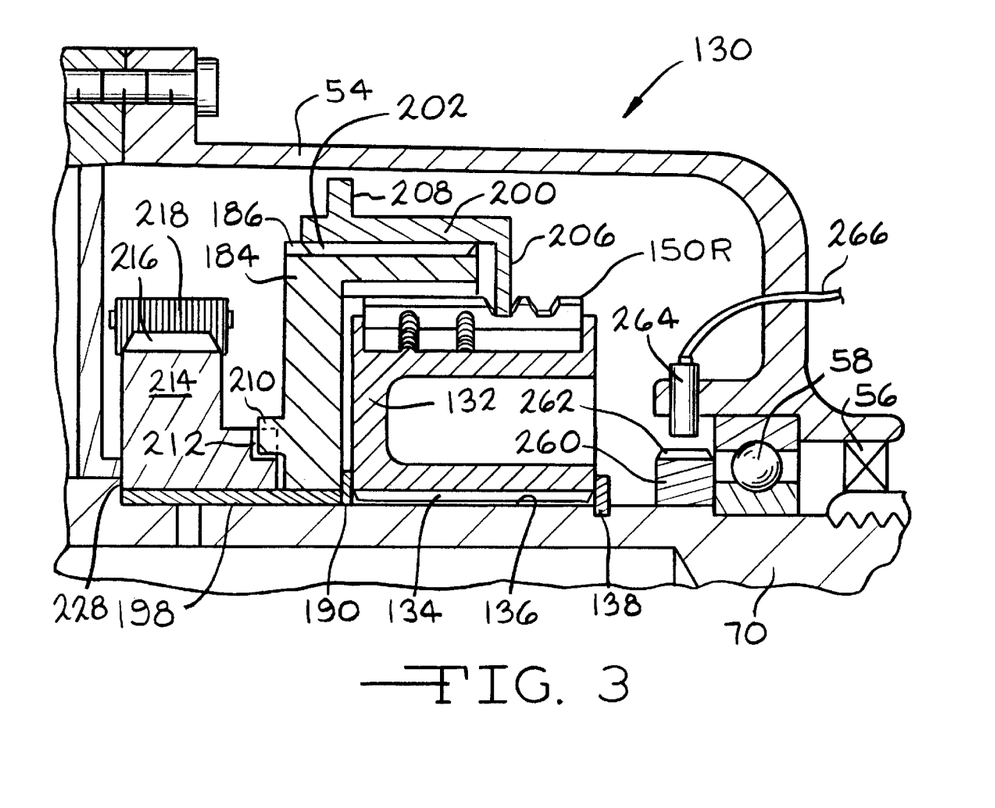
FIG. 3 is an enlarged, fragmentary, sectional view of a motor vehicle transfer case incorporating an active double overrunning clutch assembly according to the present invention.
Figure 4:
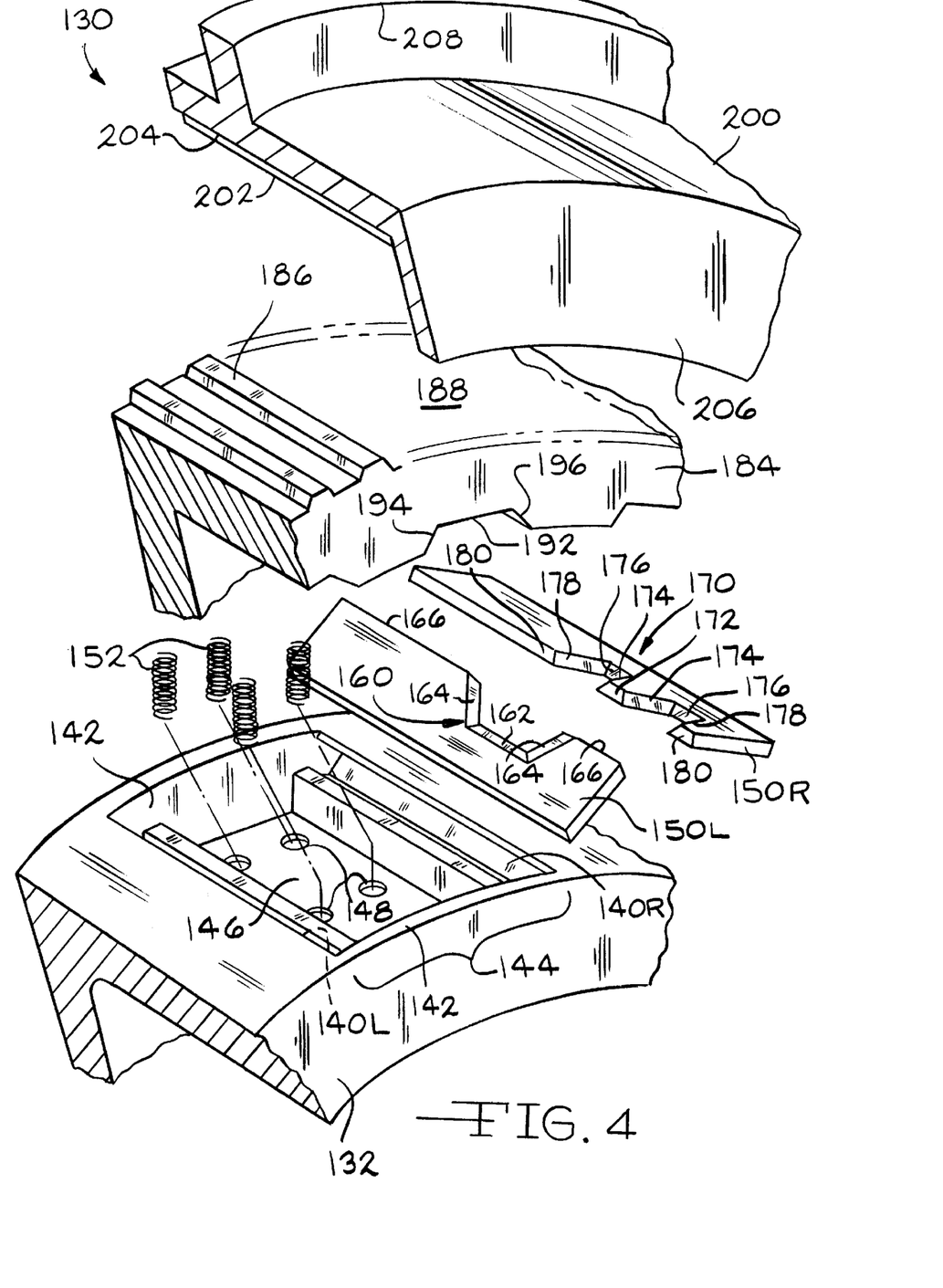
FIG. 4 is an enlarged, exploded perspective view of a portion of an active double overrunning clutch assembly according to the present invention.

Referring to FIGS. 2, 3 and 4, the transfer case assembly 16 further includes an active double overrunning clutch assembly 130 which is disposed within the housing 54 of the transfer case assembly 16, to the rear of the planetary gear assembly 60 and generally concentrically about the primary output shaft 70. The overrunning clutch assembly 130 includes an inner drive member 132 having internal or female splines or gear teeth 134 which mate with complementarily configured male splines or gear teeth 136 formed in the primary output shaft 70. A snap ring 138 or similar component seats within a complementary circumferential groove in the output shaft 70 and acts as a stop to axially limit the position of the inner drive member 132 on the output shaft 70. The inner drive member 132 includes a plurality of opposed pairs of recessed, spaced apart oblique grooves or channels 140L and 140R. The channels 140L and 140R extend axially along the inner drive member 132. At each axial end or face of the inner drive member 132 is a wall or flange 142 which substantially closes off the channels 140R and 140L. The recessed, spaced apart opposed pairs of channels 140L and 140R generally delineate recesses 144 having inner chordal surfaces 146. Blind apertures 148, which are oriented substantially normal to the chordal surface 146, are disposed in pairs generally adjacent each of the oblique channels 140L and 140R.

Freely pivotally received within each of the oblique channels 140L and 140R are a plurality of pairs of first or left elongate clutch pawls 150L and second or right elongate clutch pawls 150R. Biasing members such as pairs of coil compression springs 152 or other resilient biasing members such as leaf springs are received within the recesses and specifically the blind apertures 148 and generally provide a radially outwardly directed biasing force which displaces the ends of the pawls 150L and 150R opposite the channels 140L and 140R, respectively, away from the chordal surfaces 146. The pawls 150L and 150R may include shallow blind apertures to receive the compression springs 152. Alternatively, register pins (not illustrated) which extend into the springs 152 may be disposed on the chordal surfaces 146 and the pawls 150L and 150R.

Figure 5:
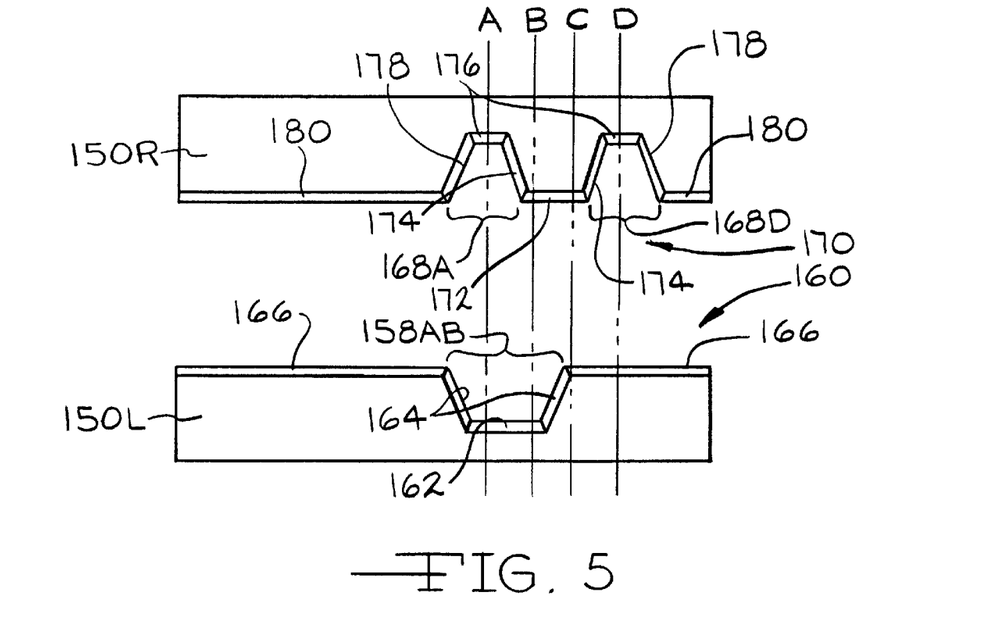
FIG. 5 is a diagrammatic, top plan view of a pair of pawls of an active double overrunning clutch assembly according to the present invention.

As best illustrated in FIG. 5, each of the plurality of left pawls 150L includes a cutaway region 158AB which generally defines a left or first cam track 160. The left cam track 160 includes a recessed center land 162 flanked by a pair of symmetrical, oblique surfaces 164 which merge with a pair of raised, spaced-apart lands 166 on opposite sides of the recessed center land 162. Similarly, each of the plurality of right pawls 150R includes cutaway regions 168A and 168D which define a second or right cam track 170. The right cam track 170 includes a centrally disposed raised land portion 172 flanked by a pair of opposed, symmetrical, oblique walls 174 which extend between the center, raised land portion 172 and a recessed pair of intermediate lands 176. A second pair of symmetrical, oblique walls 178 extend between each of the pair of recessed land portions 176 and raised outer lands 180 symmetrically disposed on opposite sides of the center, raised land portion 172.

The clutch assembly 130 also includes an outer driven member 184. It should be understood that although the inner member 132 has been described as a drive member and the outer member 184 as a driven member, these designations should not be interpreted as absolute and therefore limiting.

Rather, these designations refer to the majority of and typically encountered operating times and conditions wherein the inner drive member 132, which is coupled to and therefore driven by the primary output shaft 70, will provide torque to the outer driven member 184 but should not be construed to preclude torque transfer in the opposite direction.

The outer driven member 184 is generally L-shaped in cross section and includes a plurality of male or external splines or gear teeth 186 formed on an outer peripheral surface 188. A flat washer 190 disposed between the inner drive member 132 and the outer driven member 184 separates them and reduces friction therebetween. On an inner surface 192 of the outer driven member 184 are a plurality of pairs of obliquely disposed axially extending cam or drive surfaces 194 and 196. The outer driven member 184 is freely rotatably disposed upon the primary output shaft 70 and a friction reducing sleeve or journal bearing 198 may be disposed therebetween.

It is with the plurality of drive surfaces 194 that the plurality of right pawls 150R primarily interact and with the plurality of drive surfaces 196 that the plurality of left pawls 150L primarily interact, as will be more fully described subsequently. The drive surfaces 194 and 196 as well as the faces of the oblique channels 140L and 140R are preferably oriented such that when engaged the edges of the pawls 150L and 150R rest flat thereagainst or define a relatively small acute angle. Preferably and typically the number and angular spacing of the pluralities of pawls 150L and 150R relative to the number and angular spacing of the pluralities of drive surfaces 194 and 196 will result in two or more pawls 150L or 150R being capable of engagement at one time. For example, excellent operation has been achieved utilizing nine (9) pairs of left and right pawls 150L and 150R, respectively, and twenty-one (21) pairs of drive surfaces 194 and 196. Such an arrangement of the pawls 150L and 150R and the drive surfaces 194 and 196 ensures that three pawls 150R or 150L, angularly spaced at 120° intervals, will be capable of and will engage three correspondingly equally spaced drive surfaces 194 or 196. The number of pawls 150R and 150L and drive surfaces 194 and 196 in a given clutch assembly as well as the number engageable at one time may be varied widely depending upon such design variables as size, desired play between engaged positions, torque capacity and other parameters. Such clutch assemblies should, however, have at least two diametrically spaced-apart pawls 150L or 150R engageable at one time. Large numbers of simultaneously engaging pawls 150L and 150R, e.g., in excess of ten, do not appear to provide significant benefit.

Axially slidably received on the splines 186 and disposed about the periphery of the outer driven member 184 is a pawl control collar or sleeve 200. The pawl control sleeve 200 includes a plurality of internal or female splines or gear teeth 202 on its inner surface 204 which are complementary to the male splines or gear teeth 186 on the outer peripheral surface 188 of the outer driven member 184. Accordingly, the pawl control sleeve 200 rotates with the outer driven member 184 but is free to translate axially and bi-directionally relative thereto. The pawl control sleeve 200 includes a circumferentially and radially inwardly extending web or flange 206 which generally engages the pawls 150L and 150R and interacts with the respective cam tracks 160 and 170 as will also be more fully described below. The pawl control sleeve 200 also includes a radially outwardly and circumferentially extending projection or flange 208.

The outer driven member 184 includes a plurality of projections, lugs or face gear teeth 210 which engage complementarily configured recesses or gear teeth 212 formed in a chain drive sprocket 214. Like the outer driven member 184, the chain drive sprocket 214 is freely rotatably disposed upon the primary output shaft 70 by virtue of the journal or sleeve bearing 198. The chain drive sprocket 214 includes a plurality of chain drive teeth 216 which engage and drive a conventional chain 218. The chain 218 engages teeth 220 on a driven chain sprocket 222. The driven chain sprocket 222 is secured by an interengaging spline set 224, interference fit or other positive connection to a transfer case secondary output shaft 226. The secondary output shaft 226 is supported by a pair of anti-friction bearings such as the ball bearing assemblies 58 and an appropriate oil seal 56 is disposed between the output shaft 226 and the housing 58 of the transfer case assembly 16. A shoulder 228 on the output shaft 70 cooperates with the snap ring 138 to axially position and locate the double overrunning clutch assembly 130 on the output shaft 70.

The double overrunning clutch assembly 130 also includes an operator assembly 230. The operator assembly 230 includes a drive motor 232 having a rotating output shaft 234 to which a cylindrical cam 236 is secured. The cylindrical cam 236 defines a helical track 238 which preferably extends a significant angular extent, for example, 270°, about the cylindrical cam 236. The helical track 238 receives a pin or cam follower 242 which extends from a shift fork body 244. The shift fork body 244 defines a through cylindrical passageway 246 which receives the fixed shaft 128. Thus, the shift fork body 244 is free to translate bi-directionally along the fixed shaft 128 under the control of the rotational position of the cylindrical cam 236 and the axial position of the helical track 238. The shift fork body 244 defines an arcuate channel 248 which receives the projection or flange 208 on the pawl control sleeve 200. Thus, the pawl control sleeve 200 likewise moves axially and bi-directionally in response to repositioning of the cam follower 242 in the helical track 238 and, ultimately, rotation of the control motor 232 as will be readily appreciated.

Finally, the transfer case assembly 16 may be equipped with speed sensor assemblies. For example, a first or primary tone wheel 260 having a plurality of teeth 262 may be secured for rotation with the primary output shaft 70. A first variable reluctance or Hall effect sensor 264 having an output conductor or conductors 266 is disposed in sensing relationship with the first tone wheel 260 and provides a signal representative of the rotational speed of the primary output shaft 70 to the microcontroller 46. Likewise, a second or secondary tone wheel 270 having a plurality of teeth 272 is secured for rotation with the secondary output shaft 226. A second variable reluctance or Hall effect sensor 274 having an output conductor or conductors 276 is disposed in sensing relationship with the second tone wheel 270 and provides a signal representative of the rotational speed of the secondary output shaft 226 to the microcontroller 46.

In operation, the dual overrunning pawl clutch assembly 130 of the present invention provides a unique actively controllable double overrunning clutch having and providing four modes of operation: fully locked, drive and overrunning in a first direction, drive and overrunning in a second, opposite direction and fully disengaged or unlocked. At the outset, it should be understood that given the mechanical disposition of the overrunning clutch assembly 130 in the transfer case assembly 16 between the primary output shaft 70 and the associated primary driveline 20 and the secondary output shaft 226 and the associated secondary driveline 30, it represents the sole mechanical drive connection or torque transfer path therebetween. Thus, it controls the operating (rotational) relationship between the drivelines 20 and 30 with regard to torque delivery, overrunning, coequal rotation and independent rotation.

Figure 6A:
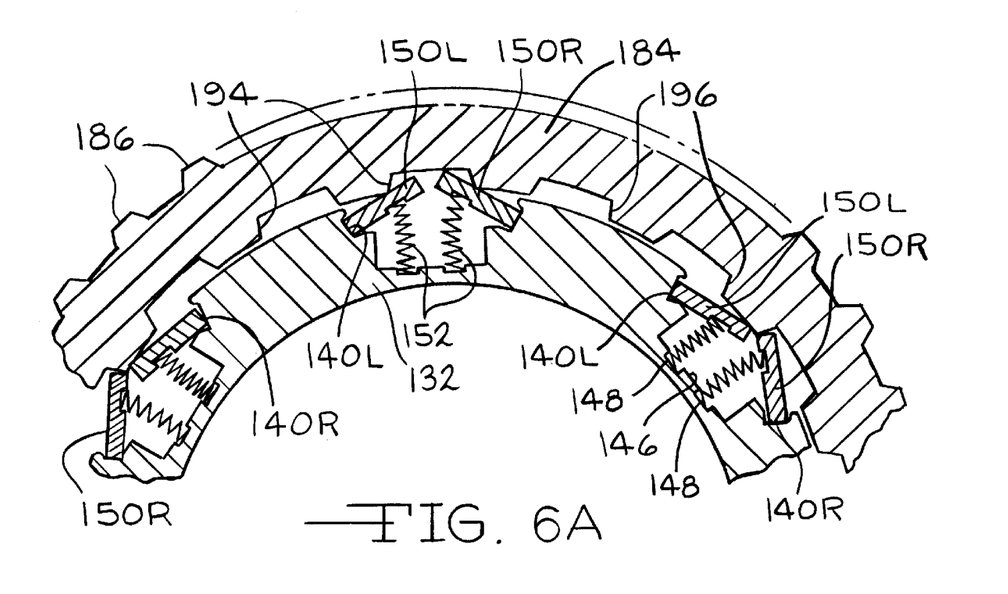
FIG. 6A is a fragmentary, sectional view of an active double overrunning clutch assembly in a first, locked position.

FIG. 6A illustrates the first operating position wherein the inner drive member 134 is effectively locked to the outer driven element 184 and thus the primary output shaft 70 and the secondary output shaft 226 of the transfer case assembly 16 rotate in unison. This locked position is achieved by a first position of the pawl control sleeve 200 which is designated position A in FIG. 5. In this position, the inwardly extending web or flange 206 of the pawl control sleeve 200 is disposed such that the cutaway regions 158AB of the plurality of left pawls 150L and the cutaway regions 182A of the plurality of right pawls 150R allow the springs 152 to drive the pluralities of pawls 150L and 150R radially outwardly and into engagement with the respective drive surfaces 196 and 194. The inner drive member 132 is thus, but for a small quantum of angular play or slack, coupled (locked) in both directions to the outer driven member 184. Thus, the primary output shaft 70 and the secondary output shaft 226 are coupled and rotate together. Torque provided to the primary output shaft 70 by the planetary gear assembly 60 or vehicle transmission 14 is thus split equally between the primary output shaft 70 and the secondary output shaft 226 as is the effect of engine braking. This operating mode is especially useful when the planetary gear assembly 60 is in low gear and the vehicle is being driven over rough terrain, on extremely slippery surfaces and in other situations where four-wheel drive and a fixed 50—50 torque split is appropriate.

Figure 6B:
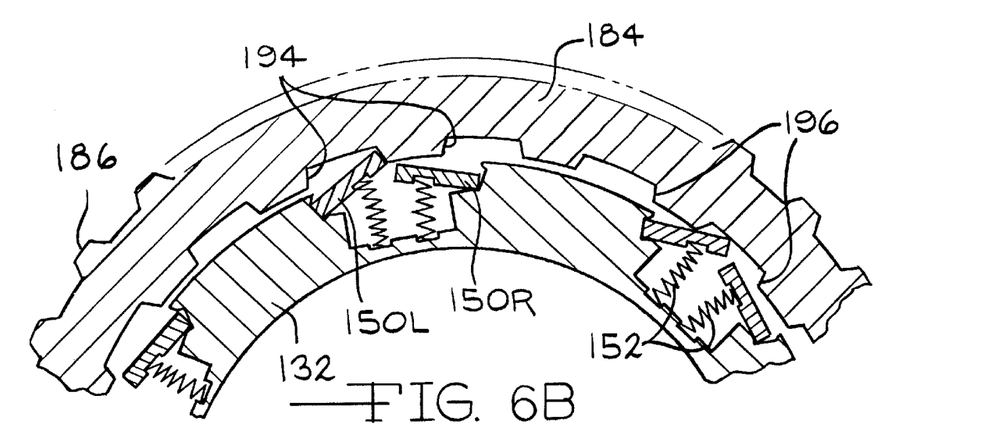
FIG. 6B is a fragmentary, sectional view of an active double overrunning clutch assembly in a second, one-way drive and overrunning position.

Referring now to FIG. 6B, upon operation of the drive motor 232, the pawl control sleeve 200 may be shifted from the position designated A in FIG. 5 to the position designated B. In the B position, the cutaway regions 158AB of the plurality of left pawls 150L are in alignment with the inwardly extending flange 206 and thus the plurality of left pawls 150L are biased outwardly and engage the plurality of surfaces 196 on the outer driven member 184. However, with regard to the plurality of right pawls 150R, the inwardly extending flange 206 engages the lands 172 and thus the plurality of right pawls 150R are disposed in a retracted, disengaged position as illustrated in FIG. 6B. The plurality of right pawls 150R thus do not engage and are incapable of engaging the drive surfaces 194. Upon clockwise rotation of the inner drive member 132, the outer driven member 184 will be driven clockwise when its speed is no greater than the speed of the inner drive member 132. However, when the outer driven member 184 is urged to rotate faster in a clockwise direction than the inner drive member 132 by vehicle activity and conditions, the outer driven member 184 may readily overrun the inner drive member 132. Thus, in position B, the outer drive member 184, the secondary output shaft 226 and the secondary driveline 30 may rotate faster in the clockwise direction than the inner drive member 132, the primary output shaft 70 and the primary driveline 20 but may not rotate slower than the inner drive member 132. As an example, if the primary output shaft 70 and thus the inner drive member 132 rotate clockwise to drive the vehicle forward, if the rear wheels lose traction and begin to slip, the clutch assembly 130 will engage to ensure that the outer driven member 184, the secondary output shaft 226 and the secondary driveline 30 rotate at least as fast as the primary output shaft 70 and primary driveline 20. However, should the vehicle turn a corner and the secondary output shaft 226 and the secondary driveline 30 be required to rotate more rapidly the primary output shaft 70 and the primary driveline 20, the clutch assembly 130 will allow such overrunning.

In the operational mode depicted in FIG. 6B and described directly above, the double overrunning clutch assembly 130 operates as a one-way or overrunning clutch providing clockwise drive and overrunning from the inner drive member 132 to the outer driven member 184 and the opposite operation if the drive direction is counter-clockwise as more fully set forth in Table I, below.

Figure 6C:
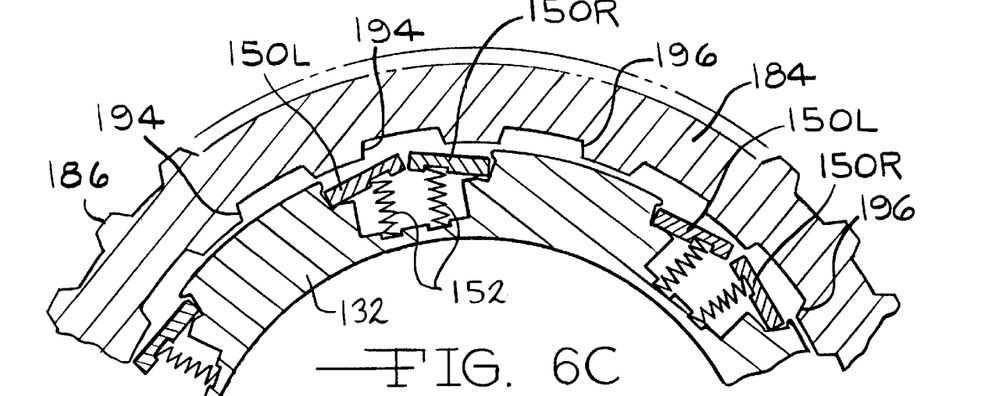
FIG. 6C is a fragmentary, sectional view of an active double overrunning clutch assembly in a third, fully released or inactive position.

Referring now to position C in FIG. 5 and FIG. 6C, the drive motor 232 may be again activated to translate the pawl control sleeve 200 to position C as illustrated in FIG. 5. In this position, the inwardly directed flange 206 of the pawl control sleeve 200 is disposed adjacent and in contact with the land 166 to the right of the cutaway region 158AB of the left pawls 150L and the flange 206 is aligned and in contact with the center land 172 of the right pawls 150R. Thus, the flange 206 drives all of the pawls 150L and 150R radially inwardly and out of contact with the drive surfaces 194 and 196. In this position of the pawl control sleeve 200 there is no mechanical interconnection or coupling between the inner drive member 132 and the outer drive member 184. Hence, there is no mechanical connection between the primary driveline 20 and the secondary driveline 30 and all power, either drive torque or engine braking, delivered to the primary output shaft 70 is provided to the primary driveline 20. In position C, the drive system 10 is, for all intents and purposes, operating as a two-wheel drive system with torque application solely through the primary driveline 20.

Figure 6D:
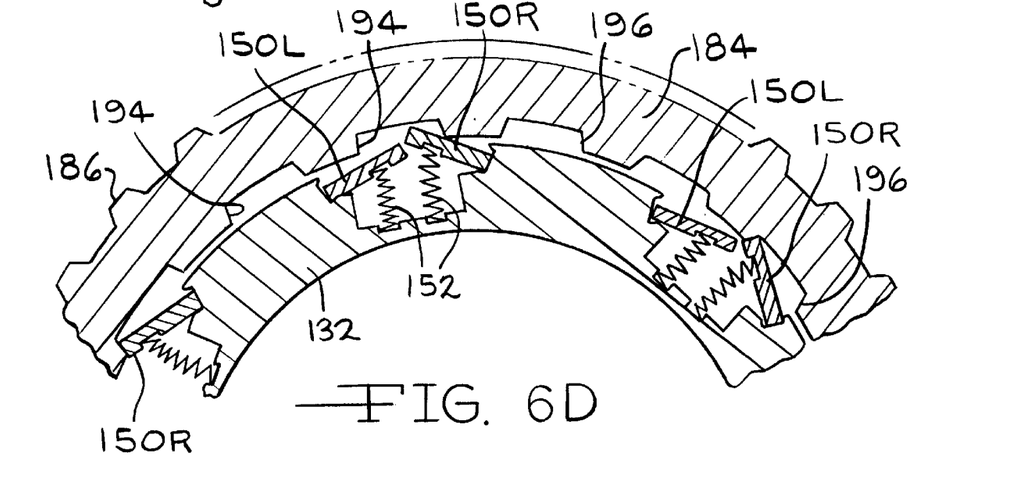
FIG. 6D is a fragmentary, sectional view of an active double overrunning clutch assembly in a fourth, one-way drive and overrunning position opposite to that illustrated in FIG. 6B.

Finally, referring to position D in FIG. 5 and FIG. 6D, the drive motor 232 has been activated to move the pawl control sleeve 200 to position D such that the inwardly extending flange 206 of the pawl control sleeve 200 engages the land 166 on the plurality of left pawls 150L, driving them inwardly and maintaining them in a disengaged state. However, the flange 206 now resides within the cutaway region 168D which allows the plurality of right pawls 150R to move outward to active positions. (Functionally, position D provides the opposite or reverse operation of that achieved in position B and illustrated in FIG. 6B.) Thus, the plurality of left pawls 150L do not engage and are incapable of engaging the drive surfaces 196 whereas the plurality of right pawls 150R are biased by the springs 152 radially outwardly such that they are capable of engaging and engage the drive surfaces 194. Given counter-clockwise rotation of the inner drive member 132, the outer driven member 184, if tending to rotate slower or at the same speed as the inner drive member 132 will be driven by the right pawls 150R. However, the outer driven member 184 may overrun the inner drive member 132 in the counter-clockwise direction.

In the operational mode depicted in FIG. 6D and described directly above, the double overrunning clutch assembly 130 operates as a one way or overrunning clutch providing counter-clockwise drive and overrunning from the inner drive member 132 to the outer driven member 184 and the opposite operation if the drive direction is clockwise as more fully set forth in Table I, below.

The following Table I sets forth the various operating conditions and active control modes (Positions A, B, C, and D) of the overrunning clutch assembly 130 of the present invention. In Part A, action of the clutch assembly 130 in Positions A and C, which are rotation independent, are presented. In Part B, action of the clutch assembly 130 relative to the rotational direction of the inner drive member 132 and the speed or direction of the outer drive member 184 is presented. The relative rotational speed of the inner member 132 is included for purposes of completeness although it is, of course, always opposite to the relative rotational speed of the outer driven member 184:

TABLE I

Part A

| Position | Rotation Independent Operation |
|---|---|
| A | Locked |
| C | Released |

Part B
Rotation Dependent Operation

| Relative Rotational Speed of | Rotation of Inner Drive Member 132 | | | |
|---|---|---|---|---|
| | Clockwise | | Counter-Clockwise | |
| Outer Driven Member 184 | Not Faster | Faster | Not Faster | Faster |
| Inner Drive Member 132 | Faster | Not Faster | Faster | Not Faster |
| Position | | | | |
| B | Driving | Overrunning | Overrunning | Driving |
| D | Overrunning | Driving | Driving | Overrunning |

From the foregoing description and Table I, it will be appreciated that the double overrunning clutch assembly 130 of the present invention provides four actively selectable drive modes or relationships between the primary driveline 20 and the secondary driveline 30 of a motor vehicle 10 and specifically the primary output shaft 70 and the secondary output shaft 226 of the transfer case assembly 16. It should be appreciated that such active control may be achieved in real time. That is, due to the relatively small mass of the pawl control sleeve 200 and its associated drive components such as the drive motor 232 and cylindrical cam 236, the control sleeve 200 may be repositioned actively and in real time in response to control signals from the microcontroller 46 which, in turn, are the result of various sensed variables of the vehicle such as the speed of the primary output shaft 70, the speed of the secondary output shaft 226 and the position of the throttle 52. In response to such variables, the control sleeve 200 may be quickly repositioned to provide one of the four operating modes of the double overrunning clutch assembly 130 in order to provide optimum power distribution, engine braking and overrunning capabilities of and between the primary driveline 20 and the secondary driveline 30.

Figure 7:
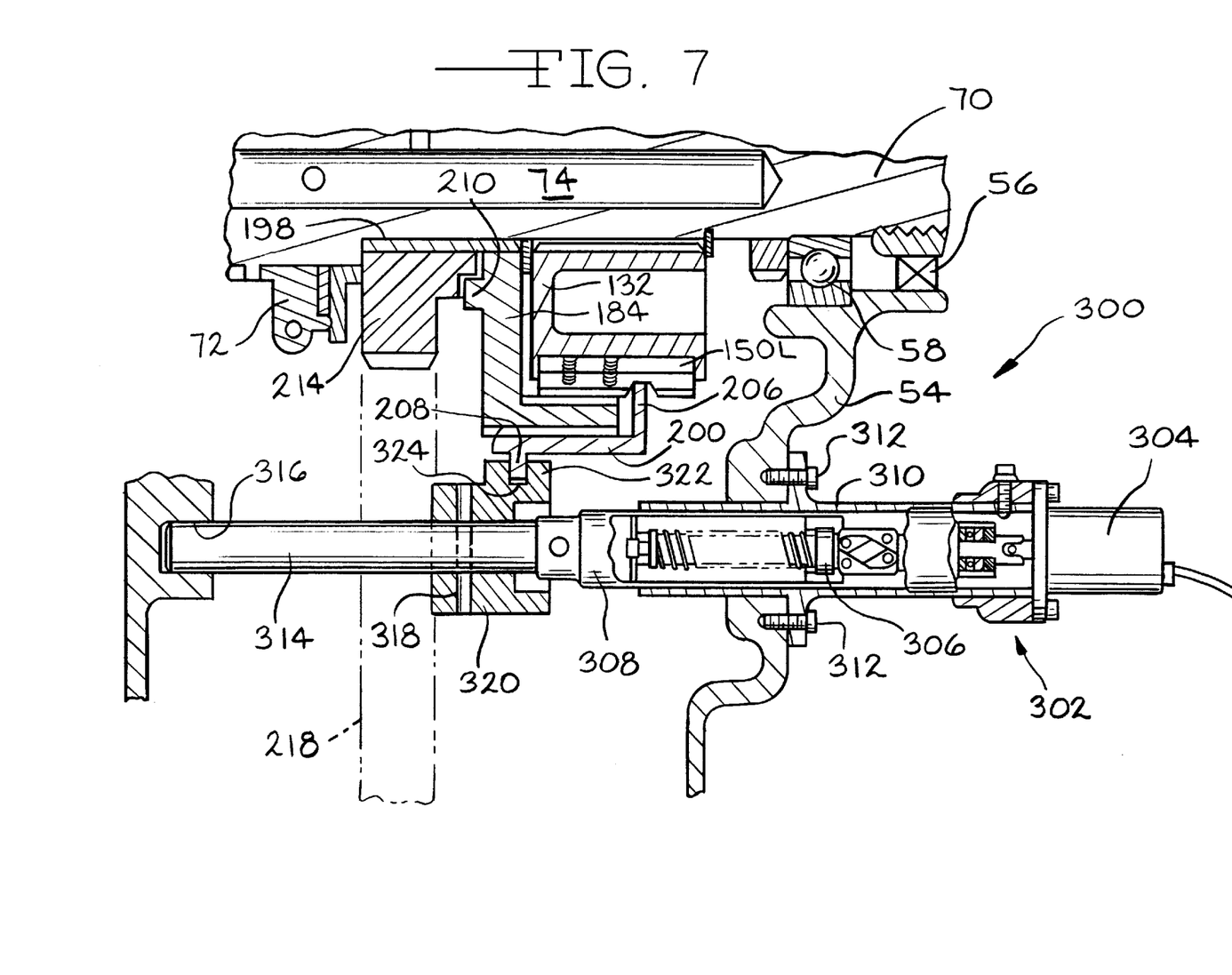
FIG. 7 is an enlarged, fragmentary, sectional view of a motor vehicle transfer case and a first alternate embodiment double overrunning clutch operator assembly according to the present invention.

Referring now to FIG. 7, a first alternate embodiment double overrunning clutch operator assembly is illustrated and generally designated by the reference numeral 300. The first alternate embodiment actuator assembly 300 include a ball screw actuator assembly 302 having a bi-directional electric drive motor 304 which is coupled to a conventional ball screw mechanism 306 which accepts the bi-directional rotational output of the motor 304 and converts it into bi-directional axial translation. Coupled to the ball screw mechanism 306 is an output member 308 which telescopes bi-directionally into and out of a generally cylindrical housing 310 which extends from the transfer case housing 54 and is secured thereto by suitable fasteners 312. The output member 308 may include a shift rail 314 which is received within and stabilized by a suitable blind opening 316 formed in the transfer case housing 54. Secured by a register or roll pin 318 to the shift rail 314 for axially translation therewith is a shift collar 320 having a shift yoke 322. The shift yoke 322 defines an arcuate channel 324 which receives a portion of the radially outwardly extending web or flange 208 on the pawl control sleeve 200. As the drive motor 304 rotates bi-directionally, the output member 308 translates axially bi-directionally as does the shift fork 320 and the pawl control sleeve 200 thereby achieving selection of one of the specific clutch positions designated A, B, C or D and described above in connection with FIGS. 6A, 6B, 6C and 6D. Thus, it will be appreciated that the acuator assembly 302 provides an alternate electromechanical means for achieving the bi-directional translation of the pawl control sleeve 200. If desired, the ball screw actuator assembly 302 may include various substantially continuous linear or incremental position sensing means (not illustrated) which provide data to, for example, the microcontroller 46 regarding the present position of the output member 308 and thus of the pawl control sleeve 200 as will be readily appreciated.

It should be appreciated that while the present invention has been described in conjunction with a pawl type clutch assembly it is readily adaptable to corresponding mechanical devices such as sprag type clutches which are hereby deemed to be equivalent.

The foregoing disclosure is the best mode devised by the inventor for practicing this invention. It is apparent, however, that apparatus incorporating modifications and variations will be obvious to one skilled in the art of overrunning clutches and power trains. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A controllable, double overrunning clutch assembly comprising, in combination,
    an inner member defining an axis,
    a concentrically disposed outer member,
    a first plurality of pawls disposed in one of said members and arranged to transfer drive energy between said members in a first direction and allow overrunning between said members in a second, opposite direction,
    a second plurality of pawls disposed in said one of said members and arranged to transfer drive energy between said members in said second direction and allow overrunning between said members in said first direction,
    a cam track disposed on each of said first and second plurality of pawls, and
    a control collar disposed for translation along said axis and engaging said cam tracks of said pluralities of pawls for selectively controlling engagement of said first plurality and said second plurality of pawls with an other of said members.

2. The controllable, double overrunning clutch assembly of claim 1 further including springs for biasing said pluralities of pawls toward said other of said members.

3. The controllable, double overrunning clutch assembly of claim 1 wherein said cam tracks disposed on said first plurality of pawls are distinct from said cam tracks disposed on said second plurality of pawls.

4. The controllable, double overrunning clutch assembly of claim 1 further including a drive assembly having a drive motor driving a cam and a follower driving said control collar.

5. The controllable, double overrunning clutch assembly of claim 1 wherein said outer member includes an outer surface having splines and said control collar includes an inner surface having splines complementary to said splines on said outer member.

6. The controllable, double overrunning clutch assembly of claim 1 further including a shaft for receiving and driving said inner member and a chain drive sprocket driven by said outer member.

7. The controllable, double overrunning clutch assembly of claim 1 further including a drive motor having an output, a drive linkage for coupling said output to said control collar and microcontroller for driving said drive motor.

8. A controllable, double overrunning clutch assembly comprising, in combination,
 a first member defining an axis of rotation and having a plurality of pairs of pawls,
 a second member having a plurality of pairs of surfaces engageable by said pawls,
 a first portion of said plurality of pawls and surfaces disposed to provide drive from said first member to said second member upon relative rotation therebetween in a first direction and overrunning between said members upon relative rotation therebetween in a second, opposite direction,
 a second portion of said plurality of pawls and surfaces disposed to provide drive between said first member and said second member upon relative rotation therebetween in said second direction and provide overrunning between said members upon relative rotation therebetween in said first direction, and
 a control sleeve moveable along said axis and cooperating with said plurality of pairs of pawls to selectively control engagement and disengagement of said plurality of pairs of pawls with said driven member.

9. The controllable, double overrunning clutch assembly of claim 8 wherein said first member is a drive member and said second member is a driven member.

10. The controllable, double overrunning clutch assembly of claim 8 further including tracks cooperating with said control sleeve formed in said plurality of pairs of pawls.

11. The controllable, double overrunning clutch assembly of claim 8 further including a first cam track formed in one of each of said pair of pawls and a second cam track distinct from said first cam track formed in an other of each of said pair of pawls.

12. The controllable, double overrunning clutch assembly of claim 8 wherein said control sleeve is moveable between a first position locking said clutch assembly, a second position providing drive and overrunning in a first direction, a third position providing drive and overrunning in a second direction, and a fourth position releasing said clutch assembly.

13. The controllable, double overrunning clutch assembly of claim 8 further including a drive assembly for translating said control sleeve, said drive assembly including a drive motor having an output and a drive linkage for coupling said output to said control sleeve.

14. The controllable, double overrunning clutch assembly of claim 8 further including a plurality of springs for biasing said pluralities of pairs of pawls toward said second member.

15. An active double overrunning clutch assembly comprising, in combination,
 a first member disposed on an axis and including a first plurality of pawls disposed in paired, opposed relationship with a second plurality of pawls,
 a second member disposed on said axis and adjacent said first member and engageable by said first and said second pluralities of pawls,
 said first plurality of pawls including first cam tracks and said second plurality of pawls including second, distinct cam tracks, and
 a sleeve operably disposed adjacent said first and said second cam tracks for translation along said axis for selectively providing at least two operational modes wherein said clutch assembly drives and overruns in a first relative direction of rotation and drives and overruns in a second relative direction of rotation, opposite to said first relative direction of rotation.

16. The controllable, double overrunning clutch assembly of claim 15 wherein said cam tracks include adjacent lands and recesses.

17. The active double overrunning clutch assembly of claim 15 further including springs for biasing said pluralities of pawls toward said second member.

18. The active double overrunning clutch assembly of claim 15 further including a drive assembly for translating said sleeve, said drive assembly including a drive motor having an output and a drive linkage for coupling said output to said control sleeve.

19. The active double overrunning clutch assembly of claim 15 wherein said sleeve and said cam tracks provide two additional operational modes wherein said first and second members are coupled together and said first and second members rotate independently.

20. The active double overrunning clutch assembly of claim 15 wherein said second member includes an outer surface having splines and said sleeve includes an inner surface having splines complementary to said splines on said second member.

21. The active double overrunning clutch assembly of claim 15 further including a shaft for receiving and driving said first member and a chain drive sprocket driven by said second member.

22. The controllable, double overrunning clutch assembly of claim 1 wherein said cam tracks include adjacent lands and recesses.

23. The active double overrunning clutch assembly of claim 1 wherein said sleeve and said cam tracks provide two additional operational modes wherein said first and second members are coupled together and said first and second members rotate independently.

24. The controllable, double overrunning clutch assembly of claim 8 wherein said cam tracks include adjacent lands and recesses.

* * * * *